_US005806865A_

United States Patent [19]

Chapman

[11] Patent Number: 5,806,865
[45] Date of Patent: Sep. 15, 1998

[54] CAMERA RISER

[75] Inventor: Leonard T. Chapman, North Hollywood, Calif.

[73] Assignee: Chapman/Leonard Studio Equipment, Inc., North Hollywood, Calif.

[21] Appl. No.: 928,191

[22] Filed: Sep. 12, 1997

Related U.S. Application Data

[63] Continuation of Ser. No. 581,675, Dec. 29, 1995, abandoned.

[51] Int. Cl.$^6$ ....................................................... B62B 3/00
[52] U.S. Cl. ..................................... 280/47.11; 280/47.34; 248/129
[58] Field of Search .............................. 280/47.11, 47.34, 280/36

[56] References Cited

U.S. PATENT DOCUMENTS

| | | | |
|---|---|---|---|
| 3,374,004 | 3/1968 | Oliver | 280/47.26 |
| 3,830,514 | 8/1974 | Green | 280/47.24 |
| 4,360,187 | 11/1982 | Chapman . | |
| 5,318,313 | 6/1994 | Chapman . | |
| 5,368,319 | 11/1994 | Hummer | 280/46 |
| 5,375,863 | 12/1994 | Chapman . | |
| 5,465,660 | 11/1995 | Conti et al. | 100/48 |
| 5,490,684 | 2/1996 | Chapman | 280/47.11 |
| 5,516,070 | 5/1996 | Chapman | 248/404 |

OTHER PUBLICATIONS

Egripment Piccolo and Dino Dolly Brochure (1 page, two sided), Egripment—Holland and U.S.A., Inc.
Cam Mate Camera Control Systems Brochure (8 pages), Cam Mate, Tempe, Arizona.
FGV Panther—Lightweight Dolly—Kombiwagen Tripod Adapter—Accessories Brochure (12 pages), FGV Panther GMBH and FGV Panther Corporation of America.
FGV Panther—The Mini–Panther Brochure (4 pages), FGV Panther Corporation of America.
Cinerent—Swiss Dolly—Hot Dog—Cinejib Brochure (26 pages) Cinerent Filmequipment Service AG, Switzerland.
The Pedolly By Chapman Brochure (6 pages), Leonard Studio Equipment, Inc.
Super Peewee By Chapman Brochure (6 pages), Leonard Studio Equipment, Inc.

*Primary Examiner*—Brian L. Johnson
*Assistant Examiner*—Bridget Avery
*Attorney, Agent, or Firm*—Lyon & Lyon LLP

[57] ABSTRACT

In a camera pedestal having a pedestal chassis supported on wheels and a separable pedestal column supported in an opening in the pedestal chassis, a camera riser is provided in between the column and chassis, to increase camera lens height without increasing the load and stress on the telescoping column. The camera riser has an upper end adapted to receive the lower end of the pedestal, and a lower end adapted to attach into or onto the chassis, in the same manner as the pedestal column attaches to the chassis, when the riser is not in use.

11 Claims, 4 Drawing Sheets

CAMERA RISER

This application is a Continuation of application Ser. No. 08/581,675, filed on Dec. 29, 1995 now abandoned.

BACKGROUND OF THE INVENTION

The field of the invention is camera pedestals, dollies, and related accessories, used in the television and motion picture industries.

Video or television and motion picture cameras must often be positioned in a particular way for a video or film sequence. The camera must also often move or sweep in azimuth or elevation, and the entire camera may need to be moved over the ground, for example, to follow an action sequence or to obtain a desired cinematographic effect. The camera may also have to be elevated or lowered at certain times, while moving or stationary. Camera pedestals and dollies are typically used for these camera positioning or moving requirements.

My U.S. Pat. Nos. 5,375,863 and 5,318,313, incorporated herein by reference, describe and illustrate a PEDOLLY® camera pedestal or dolly, which has a chassis mounted on wheels and a telescoping column supported on or in the chassis. The telescoping column may be removed and used separately. The PEDOLLY® pedestal is one type of camera support equipment, and there are various others.

To obtain increased camera lens height, camera risers are often used on camera dollies or pedestals. The riser is mounted onto the camera supporting platform of the camera or dolly (e.g., a nose plate as shown in my U.S. Pat. No. 4,360,187, or e.g., on the steering wheel assembly as shown in my U.S. Pat. No. 5,318,313). The camera (typically on a pan/tilt head) is then mounted on top of the riser. The length or height of the riser is selected to provide the desired additional camera lens height.

While conventional camera risers, as described above, may be used with the telescoping column described in my U.S. Pat. No. 5,318,313, and shown in FIG. 1, the increased height of the camera payload, and the longer effective length of the (cantilevered) column tends to reduce the rigidity of the structure supporting the camera, leading to the potential for increased inadvertent camera movement. This occurs due in part to the increased lateral and bending loads placed on the roller bearings within the telescoping column. The potential for inadvertent camera movement is highest when tall camera risers are used and quick camera pedestal movements are made.

Thus, there is a need for an improved camera riser for use on a camera pedestal having a chassis with a separable column section.

SUMMARY OF THE INVENTION

To these ends, in a camera pedestal having a pedestal chassis supported on wheels, and a column supported on or in the chassis, a camera riser is provided for raising up the column, by installing the riser in between the chassis and column. Preferably, the camera riser has a lower end adapted to fit in or on an opening in the chassis. The upper end of the camera riser advantageously is adapted to receive and secure the lower end of the column (which ordinarily would be installed directly onto or into the chassis).

Accordingly, it is an object of the invention to provide an improved camera riser. Other and further objects will appear hereinafter.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
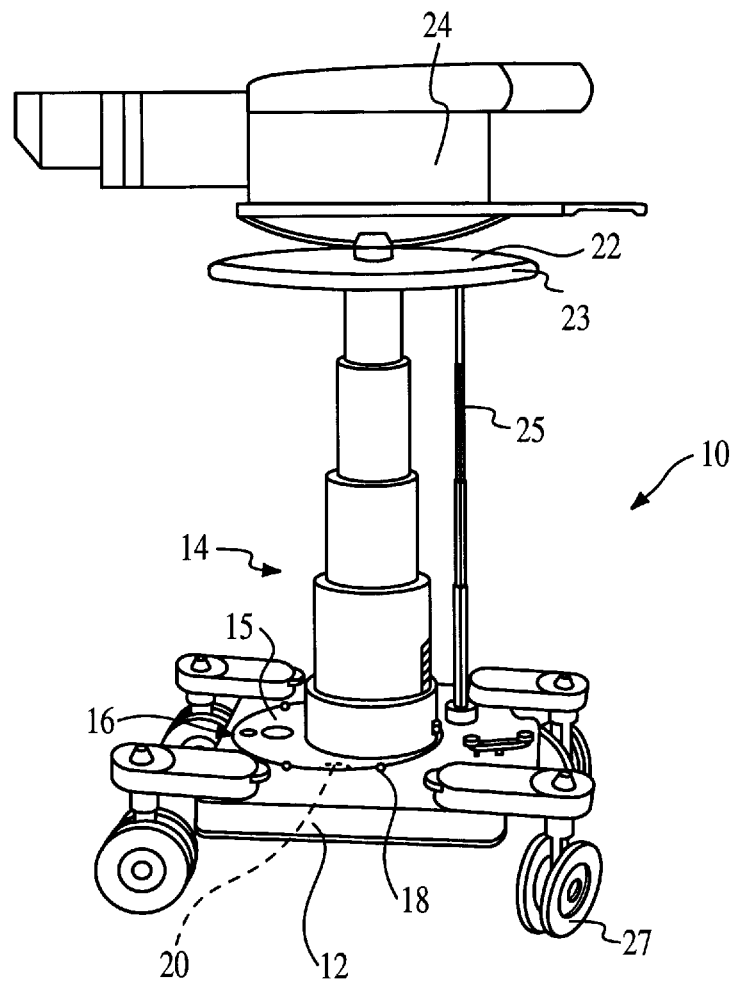
FIG. 1 is a perspective view of the PEDOLLY camera dolly/pedestal, distributed by Leonard Studio Equipment, Inc., North Hollywood, Calif., and as described in my U.S. Pat. No. 5,318,313.

Turning now in detail to the drawings, as shown in FIG. 1, the PEDOLLY camera pedestal/dolly 10, has a chassis or dolly section 12 and a separable telescoping column section 14. A tank 15 at the base or bottom of the column section 14 holds compressed gas to provide counterbalancing of the camera payload. The tank 15 rests within a column section opening 16 in the dolly section 12, when the column section 14 is installed onto or into the dolly section 12. Cams 18 provided around the column section opening 16 on the dolly section 12 clamp the column section 14 in place, and prevent movement between the column section 14 and dolly section 12, when the camera pedestal 10 is in use. Rollers 20 are provided on the dolly section 12 around the column section opening 16, so that when the cams 18 are released, the column section 14 may be turned or rotated within the column section opening 16. This rotation of the column section 14 provides advantages as described in my U.S. Pat. No. 5,318,313.

The camera 24 is mounted on a plate 22 of a steering wheel assembly 23 on top of the column section 14. A telescoping steering drive tube 25 mechanically links the steering wheel assembly to a steering system within the dolly section 12, so that rotation of the steering wheel 23 can drive corresponding movement of the dolly wheels 27.

Turning to FIGS. 2–5, the present camera riser 30 has a hollow cylindrical body 38. The length or height H of the riser body 38 is selected to match the increase in lens height desired. The camera riser 30 may be provided with height H of e.g., six inches, 12 inches, and 18 inches, with the camera crew selecting the appropriate riser for a specific application. The upper end 32 of the riser 30 has riser cams 36 which operate in the same way as the cams 18 on the dolly section 12.

Figure 3:
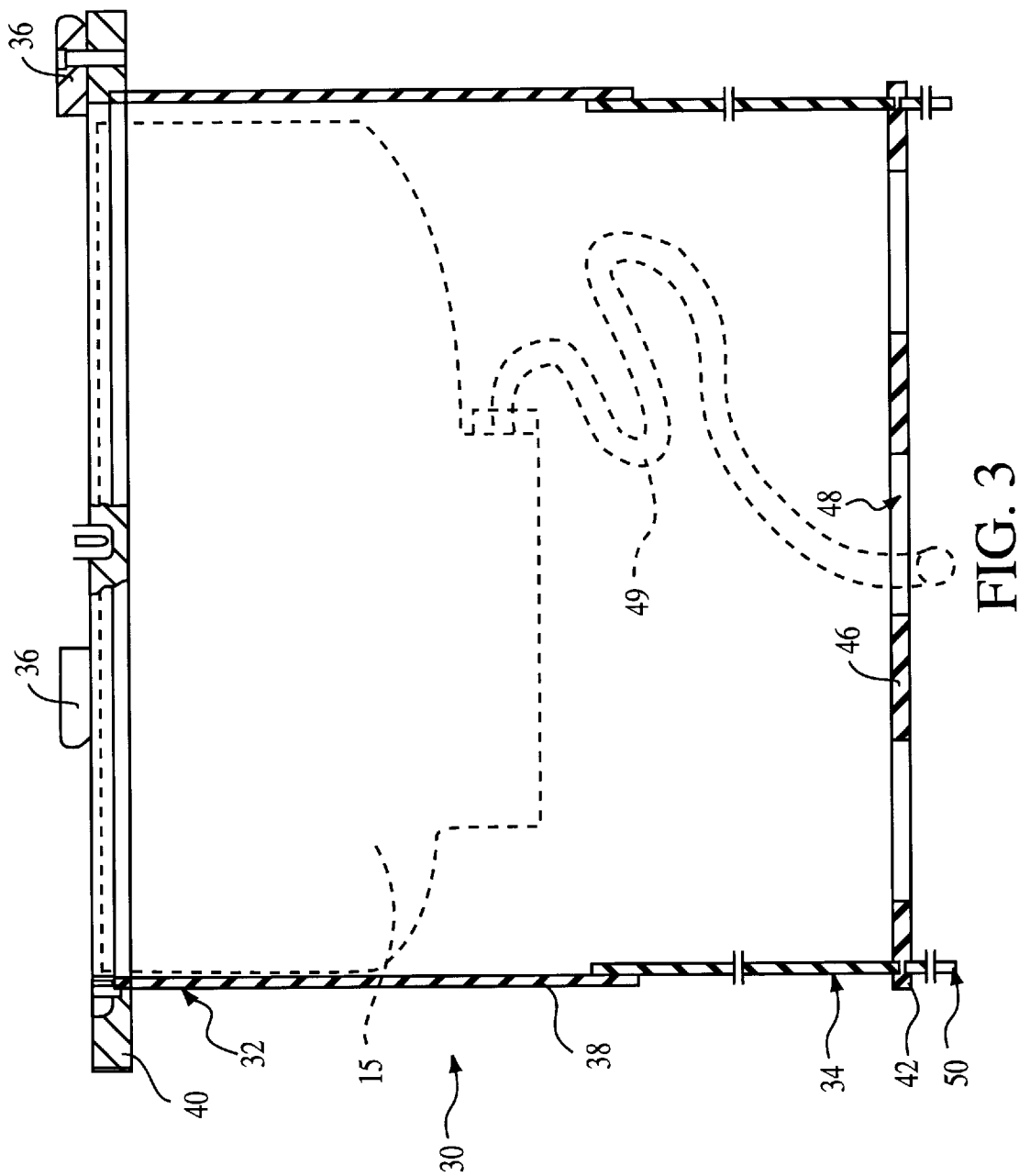
FIG. 3 is a section view of the camera riser shown in FIG. 2.
Figure 4:
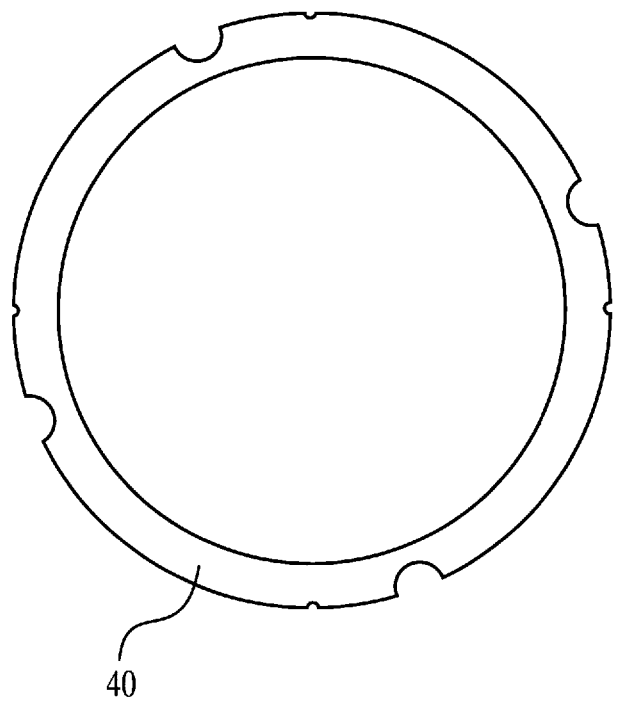
FIG. 4 is a plan view thereof.
Figure 5:
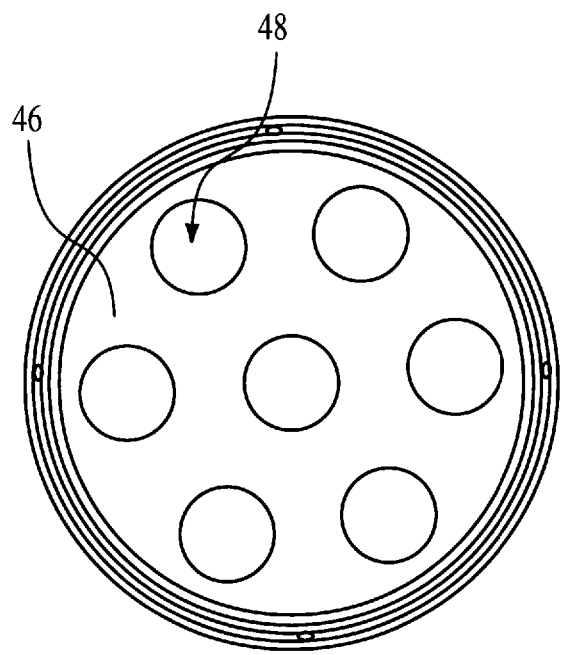
FIG. 5 is a bottom view thereof.

Referring to FIG. 3, the inside diameter of the upper end 32 replicates the column section opening 16 in the dolly section 12, so that the tank 15 and lower end of the column section 14 will fit into the upper end 32 of the riser 30, just as the tank 15 and lower end of the column section 14 fit into or onto the dolly section 12. The riser cams 36 are supported on an upper rim 40 around the upper end 32 of the riser 30.

The lower end 34 of the riser 30 is configured to mount into or onto the column section opening 16 in the dolly section 12, and therefore preferably replicates the mounting features on the lower end of the column section 14. Specifically, the lower end 34 of the riser 30 has a bottom rim 42. A locating ring 50 extends below the bottom rim 42. For structural support, a floor plate 46 is provided within the bottom rim 42. The floor plate 46 may include holes 48 to reduce weight.

As shown in FIG. 3, the riser 30 is preferably manufactured as an aluminum weldment.

Figure 2:
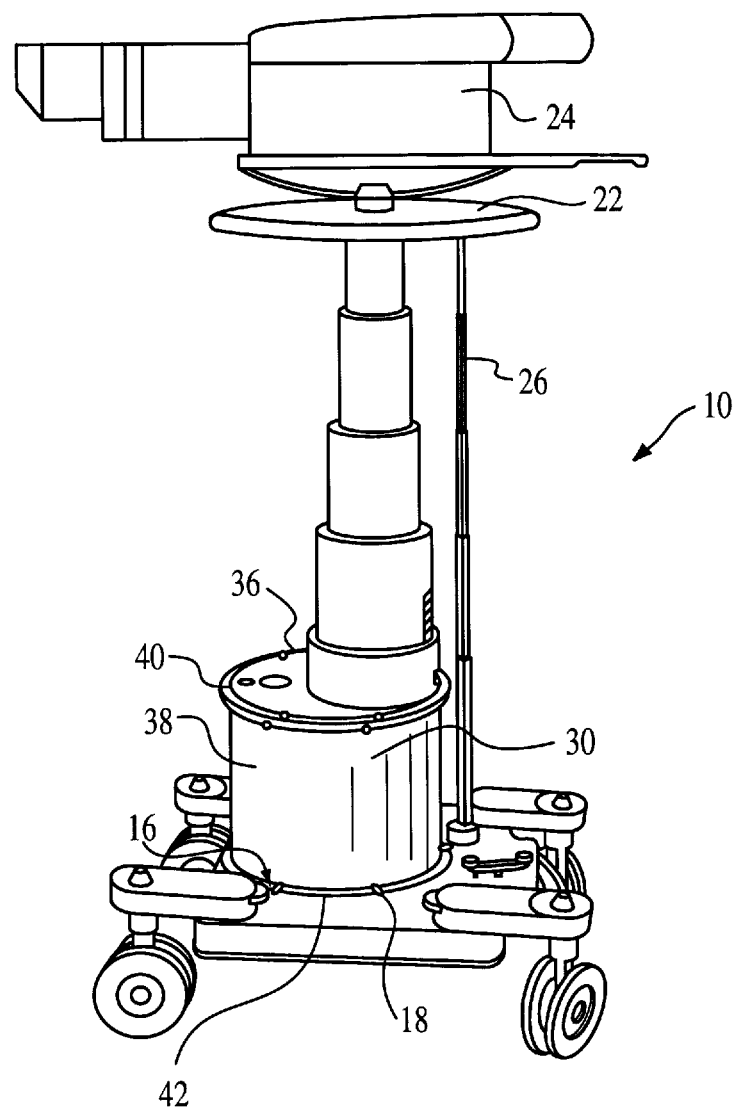
FIG. 2 is a perspective view of the camera pedestal of FIG. 1 with the present camera riser installed.

In use, as shown in FIGS. 2 and 3, a riser 30 having a selected height H is placed onto the dolly section 12. The locating ring 50 sits within the column section opening 16 and the bottom rim 42 rests on the upper deck of the dolly section 12. The cams 18 on the dolly section are moved into position over the bottom rim 42 and tightened down to securely attach the riser 30 onto the dolly section 12. The column section 14 is then placed on top of the riser 30, with the tank 15 extending partially into the hollow interior of the riser 30, as shown in FIG. 3. The riser cams 36 are moved over the rim on the column section 14 and are tightened down to securely attach the column section 14 to the riser 30.

The camera lens height is increased by the length H of the riser 30. The telescoping steering drive tube 25 (shown in FIG. 1) is replaced by a longer similar telescoping steering drive tube 26, to accommodate the increased distance between the steering wheel assembly 22 and the dolly section 12 containing the steering system. Alternatively, an attachable drive tube extension of length H may be used to adapt the length of the telescoping steering drive tube to the increased distance.

If the column section 14 uses a hydraulic drive accessory, as described in my U.S. patent application Ser. No. 08/188,137, filed Jan. 26, 1994, now U.S. Pat. No. 5,516,070, incorporated herein by reference, then connection to the column section 14 from the hydraulic drive accessory unit may be made by a flexible hydraulic line 49 which extends up through the riser 30 and is long enough to connect to the column section 14.

The loads on the column section 14 remain unchanged, whether or not the riser 30 is used. Although the increase in column height results in substantial (primarily bending) loads on the riser 30, the riser, having no load bearing moving parts is well adapted to handle such loads, in contrast to the column section 14 (which has multiple telescoping sections and rollers). Similarly, the dolly section 12 (including the e.g., wheels, axles, legs, and chassis) are readily able to bear the increased loads resulting from the heightened column. The riser 30 accordingly achieves the increase in camera lens height, without increasing loads on the column section. An increase in lens height is achieved without significant loss of secure camera support.

Thus, while a single embodiment has been shown and described, various changes may be made without departing from the spirit and scope of the invention. The invention, therefore, should not be restricted, except by the following claims.

I claim:

1. In a camera pedestal having a pedestal chassis supported on wheels, and a pedestal column supported in an opening in the pedestal chassis, the improvement comprising:

a camera riser for raising the pedestal column, the camera riser having a lower end adapted to fit in the opening in the pedestal chassis, and having an upper end adapted to receive the pedestal column;

wherein the camera riser has a cylindrical hollow body so that a compressed gas tank may rest within the cylindrical hollow body; and said camera riser being a separate element from the pedestal column.

2. The camera pedestal of claim 1 further comprising:

a top rim on the camera riser, and clamping means attached around the top rim, said clamping means adapted for clamping the pedestal column onto the riser.

3. The camera pedestal of claim 1 wherein the camera riser has a diameter approximately equal to the diameter of the opening.

4. The camera pedestal of claim 1 further comprising a floor plate attached inside of the hollow body, said floor plate having at least one hole therethrough.

5. The camera pedestal of claim 1 wherein the camera riser is cylindrical.

6. The camera pedestal of claim 1 further comprising a locating ring at the lower end of the riser, said locating ring sitting within the opening in the pedestal chassis.

7. A camera riser for use as an accessory with a camera pedestal having a pedestal column, comprising:

a hollow cylindrical body having an upper end and a lower end;

an upper rim around the upper end of the body;

a lower rim around the lower end of the body;

a floor plate within the body adjacent the lower end of the body, said floor plate having at least one hole therethrough; and a compressed gas tank within a space defined by the upper end and lower end.

8. The camera riser of claim 7 further comprising:

clamping means at the upper end of the riser, said clamping means adapted for clamping the pedestal to the riser; and a locating ring at the lower end of the riser, said locating ring sitting within the opening in the pedestal chassis.

9. A camera support comprising:

a dolly having a chassis, wheels rotatably attached to the chassis, and a receptacle opening in the chassis;

a camera riser having a body with an upper end and a lower end, and with lower end adapted to mount in the receptacle opening in the chassis, the body having a lower rim around the lower end, and an upper rim around the upper end;

a pedestal having a lower end adapted to mount in the upper end of the camera riser, the pedestal also including a telescoping column and a compressed gas tank, said camera riser adapted to receive the compressed gas tank within a space defined by the upper end and lower end; and said camera riser being a separate element from the pedestal.

10. The camera pedestal of claim 9 further comprising a floor plate in the lower end of the camera riser.

11. The camera pedestal of claim 9 wherein the body comprises a hollow cylinder.

* * * * *